United States Patent
Lv et al.

(10) Patent No.: US 11,294,651 B2
(45) Date of Patent: Apr. 5, 2022

(54) CODE EXECUTION METHOD, DEVICE, AND RENDERING APPARATUS

(71) Applicant: Baidu Online Network Technology (Beijing) Co., Ltd., Beijing (CN)

(72) Inventors: Sheng Lv, Beijing (CN); Jie Wang, Beijing (CN); Yan Wang, Beijing (CN); Yuanhang Zhang, Beijing (CN); Hongwei Cao, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 0 days.

(21) Appl. No.: 16/876,936

(22) Filed: May 18, 2020

(65) Prior Publication Data

US 2021/0117169 A1    Apr. 22, 2021

(30) Foreign Application Priority Data

Oct. 21, 2019    (CN) .......................... 201911001932.7

(51) Int. Cl.
*G06F 8/41*    (2018.01)
*G06F 9/445*    (2018.01)
*G06F 9/455*    (2018.01)

(52) U.S. Cl.
CPC .............. *G06F 8/447* (2013.01); *G06F 9/445* (2013.01); *G06F 9/45558* (2013.01);
(Continued)

(58) Field of Classification Search
None
See application file for complete search history.

(56) References Cited

U.S. PATENT DOCUMENTS 9,256,440 B1 *    2/2016    Cattaneo ............. G06F 9/44505
9,501,269 B2 *    11/2016    Rodgers .................. G06F 8/447
(Continued)

FOREIGN PATENT DOCUMENTS

| CN | 108376066 A | 8/2018 |
| CN | 109697060 A | 4/2019 |
| JP | 2016-514880 | 5/2016 |

OTHER PUBLICATIONS

Chinese Office Action (with translation) for Chinese Patent Application No. 2020-088761 dated Jun. 18, 2021 (4 Pages).
(Continued)

*Primary Examiner* — Ryan D. Coyer
(74) *Attorney, Agent, or Firm* — Neal, Gerber & Eisenberg LLP

(57) ABSTRACT

A code execution method and device, as well as a rendering apparatus are provided. A specific solution includes: receiving an initialization instruction from an execution engine, the initialization instruction being acquired by loading target codes through the execution engine; sending a registration instruction to a registration component according to the initialization instruction, to create a wrapper object required for executing the target codes; compiling the target codes to acquire an execution codes corresponding to the target codes, according to a mapping relationship between the wrapper object and native codes of an operating system; and sending the execution codes to the execution engine to execute the execution codes. The execution engine can mainly control the code execution process, thereby improving a code execution efficiency.

20 Claims, 10 Drawing Sheets

(52) U.S. Cl.
CPC .............. *G06F 2009/4557* (2013.01); *G06F 2009/45562* (2013.01); *G06F 2009/45579* (2013.01)

(56) References Cited

U.S. PATENT DOCUMENTS

| | | | |
|---|---|---|---|
| 2001/0039598 A1* | 11/2001 | Moon ................. | G06F 9/45512 719/328 |
| 2004/0095387 A1* | 5/2004 | Demsey ................. | G06F 9/451 715/762 |
| 2006/0107222 A1 | 5/2006 | Gallagher | |
| 2012/0266165 A1* | 10/2012 | Cen ...................... | G06F 9/4856 718/1 |
| 2014/0282516 A1* | 9/2014 | McConaughy ........... | G06F 8/65 718/1 |
| 2016/0092181 A1 | 3/2016 | Rodgers et al. | |
| 2016/0224325 A1 | 8/2016 | Sidwell et al. | |
| 2018/0349108 A1* | 12/2018 | Brebner ................. | H04W 4/80 |
| 2019/0012150 A1* | 1/2019 | Dimitrov ................ | G06F 8/315 |

OTHER PUBLICATIONS

JavaScript and the Nikkei software which are firmly learned from foundations, Japan, Nikkei BP, Apr. 24, 2016, vol. 19, No. 7, pp. 102-109.
First Chinese Office Action from Chinese Patent Application No. 201911001932.7 dated Nov. 3, 2021.
Search Report from Chinese Application No. 2019110019327 dated Nov. 3, 2021.
Huang, Yao-Chih et al., "File-Based Sharing For Dynamically Compiled Code On Dalvik Virtual Machine", Department of Computer Science, National Chiao Tung University, Hsinchu City 300, Taiwan, Jan. 10, 2011.
Zhang, Yuan, "Improving the Security of Android Platform", Chinese Excellent Doctoral Dissertation full text database (Doctoral) Information Technology Series, vol. 2016, Issue 1, Jan. 15, 2016. (English Abstract Only).
Zhang, Zhi, "Research and Application of Key Technologies of Cloud Computing and Internet of Things" Dec. 31, 2018.

* cited by examiner

CODE EXECUTION METHOD, DEVICE, AND RENDERING APPARATUS

PRIORITY CLAIM

This application claims the benefit of and priority to Chinese Patent Application No. 201911001932.7, filed on Oct. 21, 2019 and entitled "Code Execution Method, Device, and Rendering Apparatus", which is hereby incorporated by reference in its entirety.

TECHNICAL FIELD

The present disclosure relates to a field of computer technology, and in particular, to a field of computer displaying technology.

BACKGROUND

A main function of a rendering engine is to transform a resource file into a result visible to a user. In related arts, the resource file is compiled by the rendering engine in a device end to achieve a rendering effect. However, compilation processes of the rendering engine require a large amount of calculations, and there are certain problems such as a slow speed for rendering.

SUMMARY

A code execution method, applied to a virtual machine, is provided according to certain embodiments of the present disclosure. In these embodiments, the code execution method includes:
  receiving an initialization instruction from an execution engine, the initialization instruction being acquired by loading target codes through the execution engine;
  sending a registration instruction to a registration component according to the initialization instruction, to create a wrapper object required for executing the target codes;
  compiling the target codes to acquire an execution codes corresponding to the target codes, according to a mapping relationship between the wrapper object and native codes of an operating system; and
  sending the execution codes to the execution engine to execute the execution codes.

In certain embodiments of the present application, a wrapper object can be created through the virtual machine by controlling the registration component, and the compilation of the target codes is transferred to the virtual machine. The execution engine can mainly control the code execution process, thereby improving a code execution efficiency.

In an implementation, the initialization instruction comprises an identification of the wrapper object to be initialized, and the sending a registration instruction to a registration component according to the initialization instruction to create the wrapper object required for executing the target codes includes sending, to the registration component, the registration instruction comprising the identification of the wrapper object to be registered, wherein the registration component creates a corresponding wrapper object in a wrapper module according to the identification of the wrapper object to be registered.

In the above implementation, the wrapper object is created in the wrapper module through the virtual machine to control the registration component, so that the execution codes corresponding to the target codes are compiled according to the mapping relationship between the wrapper object and the native codes of the operating system, thereby improving a code compilation efficiency and a code execution efficiency.

In an implementation, the code execution method further includes:
  receiving an execution instruction from the execution engine, the execution instruction being acquired by executing the execution codes through the execution engine; and
  sending a calling instruction to a calling component according to the execution instruction, to call the wrapper object in a wrapper module.

In the above implementation, after receiving the execution instruction of the execution engine, the virtual machine can control the calling component to call the wrapper object that has been created, thereby enabling the operating system to execute the native codes corresponding to the called wrapper object. In this way, a code compilation efficiency and a code execution efficiency can be improved due to the separation of code compilation and execution.

In an implementation, the execution instruction comprises an identification of the wrapper object to be executed, a method name of the wrapper object to be executed, and a parameter of the wrapper object to be executed, and the calling component is an invoker, and the sending a calling instruction to a calling component according to the execution instruction, to call the wrapper object in a wrapper module includes: sending the calling instruction comprising the identification, method name, and parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system.

In the above implementation, the virtual machine controls the invoker to call the wrapper object in the wrapper module using the identification, the method name, and the parameter of the wrapper object, to execute the native codes corresponding to the wrapper object in the operating system, so that the mapping and calling of the codes can be separated and multiple wrapper objects can be continuously called. Therefore, objects can be reused, and the code execution efficiency is improved.

In an implementation, the receiving an initialization instruction from an execution engine includes: receiving the initialization instruction from the execution engine through a bridge.

In an implementation, the sending the execution codes to the execution engine to execute the execution codes includes: sending the execution codes to the execution engine through a bridge for execution.

In the above implementation, a message can be exchanged between the execution engine and the virtual machine through the bridge, so that a message transmission between the target codes and the native codes can be realized, and a capacity of the operating system itself are fully utilized, which is beneficial to improve the code execution efficiency while ensuring security.

In an implementation, the code execution method further includes:
  receiving feedback information from the wrapper module, the feedback information comprising an execution result acquired by a wrapper module from the operating system; and
  sending the feedback information to the execution engine.

In the above implementation, the virtual machine may receive feedback information from the wrapper module, and feed the execution result of the operating system back to the execution engine through the virtual machine, so that the execution engine can proceed to execute subsequent execution codes in combination with the feedback information.

A code execution device, applied to a virtual machine, is provided according to certain embodiments of the present disclosure. In these embodiments, the code execution device includes:
  a first receiving unit configured to receive an initialization instruction from an execution engine, the initialization instruction being acquired by loading target codes through the execution engine;
  a first sending unit configured to send a registration instruction to a registration component according to the initialization instruction, to create a wrapper object required for executing the target codes;
  a compiling unit configured to compile the target codes to acquire an execution codes corresponding to the target codes, according to a mapping relationship between the wrapper object and native codes of an operating system; and
  a second sending unit configured to send the execution codes to the execution engine to execute the execution codes.

In an implementation, the initialization instruction comprises an identification of the wrapper object to be initialized, and the first sending unit is further configured to send, to the registration component, the registration instruction comprising the identification of the wrapper object to be registered, wherein the registration component creates a corresponding wrapper object in a wrapper module according to the identification of the wrapper object to be registered.

In an implementation, the code execution device further includes:
  a second receiving unit configured to receive an execution instruction from the execution engine, the execution instruction being acquired by executing the execution codes through the execution engine; and
  a third sending unit configured to send a calling instruction to a calling component according to the execution instruction, to call the wrapper object in a wrapper module.

In an implementation, the execution instruction comprises an identification of the wrapper object to be executed, a method name of the wrapper object to be executed, and a parameter of the wrapper object to be executed, and the calling component is an invoker, and the third sending unit is further configured to send the calling instruction comprising the identification, method name, and parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system.

In an implementation, the code execution device further includes:
  a third receiving unit configured to receive feedback information from the wrapper module, the feedback information comprising an execution result acquired by a wrapper module from the operating system; and
  a fourth sending unit configured to send the feedback information to the execution engine.

A rendering apparatus is provided in certain embodiments of the present application, the rendering apparatus including:
  an execution engine configured to send an initialization instruction to a virtual machine, the initialization instruction being an instruction acquired by loading a target codes through the execution engine; and receive execution codes, corresponding to the target codes, returned by the virtual machine;
  a virtual machine configured to execute the code execution method of any embodiment of the present application; and
  a registration component configured to receive a registration instruction from the virtual machine to create a wrapper object required to execute the target codes.

In an implementation, the execution engine is further configured to send an execution instruction to the virtual machine, wherein the execution instruction is an instruction acquired by executing the execution codes through the execution engine; and the rendering apparatus further includes a calling component configured to receive a calling instruction from the virtual machine to call the wrapper object in a wrapper module, and the wrapper module comprising at least one wrapper object required to execute the target codes.

In an implementation, the rendering apparatus further includes: a bridge configured to send the initialization instruction from the execution engine to the virtual machine, and send the execution codes from the virtual machine to the execution engine.

An electronic apparatus is provided in an embodiment of the application, includes:
  at least one processor; and
  a memory communicated with the at least one processor; wherein
  instructions executable by the at least one processor is stored in the memory, and the instructions executed by the at least one processor to enable the at least one processor to implement the methods provided by any one of the embodiments of the present application.

A non-transitory computer-readable storage medium storing computer instructions is provided in an embodiment of the application, wherein the computer instructions is configured to enable a computer to implement the methods provided by any one of the embodiments of the present application.

One embodiment in the above application has the following advantages or beneficial effects of a wrapper object being created through the virtual machine by controlling a registration component, and the compilation of the target codes being transferred to the virtual machine. The execution engine can mainly control the code execution process, thereby improving the code execution efficiency.

Other effects of the foregoing optional manners will be described below in conjunction with specific embodiments.

BRIEF DESCRIPTION OF THE DRAWINGS

The drawings are used to better understand the solution, and do not constitute a limitation on the application. among them:

FIGS. 2A and 2B are schematic diagrams of codes in a code execution method according to an embodiment of the present application;

DETAILED DESCRIPTION

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for public knowledge of functions and structures are omitted in the following descriptions.

Figure 1:
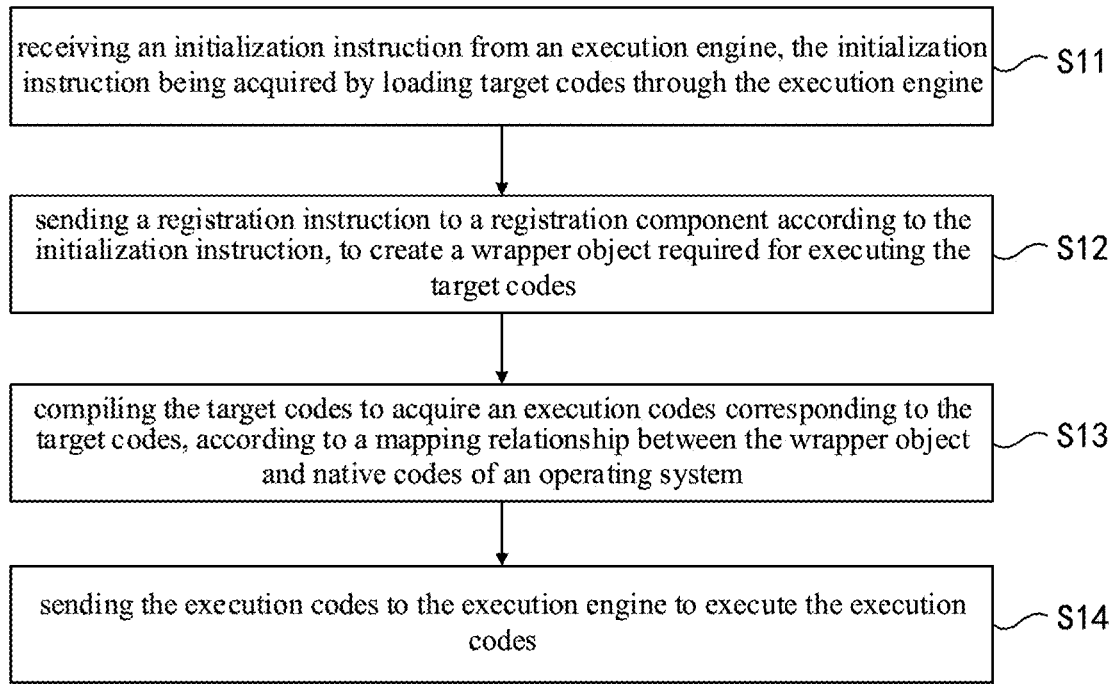
FIG. 1 is a schematic flowchart of a code execution method according to an embodiment of the present application.

FIG. 1 is a schematic flowchart of a code execution method according to an embodiment of the present application. As shown in FIG. 1, the code execution method may be applied to a virtual machine, and the code execution method may include:

S11, receiving an initialization instruction from an execution engine, the initialization instruction being acquired by loading target codes through the execution engine;

S12, sending a registration instruction to a registration component according to the initialization instruction, to create a wrapper object required for executing the target codes;

S13, compiling the target codes to acquire an execution codes corresponding to the target codes, according to a mapping relationship between the wrapper object and native codes of an operating system; and S14, sending the execution codes to the execution engine to execute the execution codes.

Figures 2A, 2B:
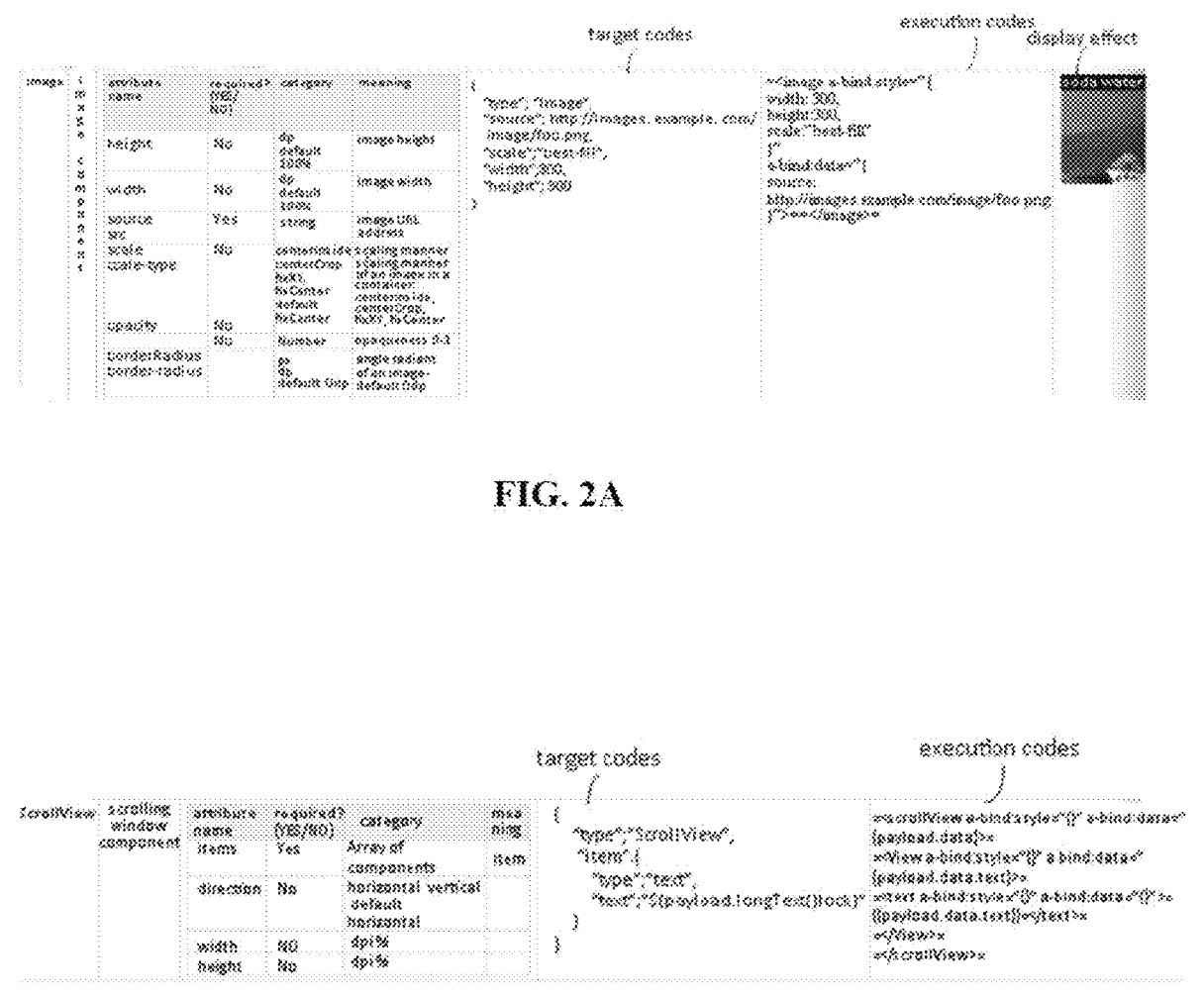

In an embodiment of the present application, the execution engine may initialize the target codes and execute the execution codes corresponding to the target codes. The target codes may include codes that need to implement a certain function, such as a rendering effect. For example, referring to FIG. 2A, the target codes may include codes required to render an image component (Image component, may also be called a picture component), and the codes may include attributes such as a "type" of the image component, an image address "source", a scaling mode "scale", "width", "height" and the like. As another example, referring to FIG. 2B, the target codes may include codes required to render a scrolling window component (ScrollView). The codes may include attributes such as a "type" of the scrolling window component, a "item" of the scrolling window component and the like, and may also include attributes such as "direction", "width", "height" and the like.

Figure 3:
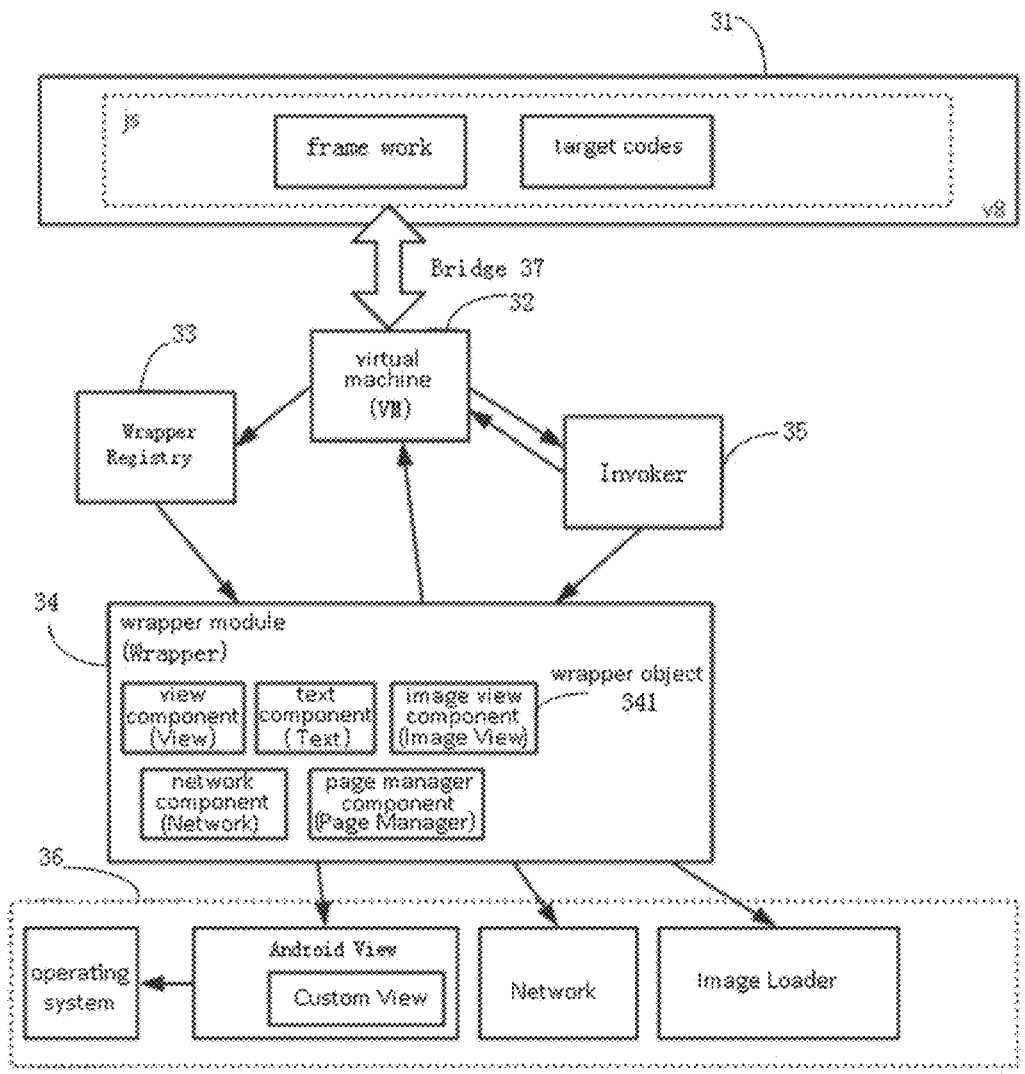
FIG. 3 is a schematic diagram of an application example of a code execution method according to an embodiment of the present application.

In an example, a rendering template can be used at a server end to generate object codes facilitating to be executed at the device end. After receiving the target codes, the device end can run these codes and display them on a screen. Referring to FIG. 3, after receiving the target codes in JavaScript (abbreviated as JS) format, such as product codes, the execution engine 31 may send an initialization instruction to the virtual machine 32 (for example, Atom VM) during loading the target codes.

In certain embodiments of the present application, a wrapper object can be created through the virtual machine by controlling the registration component, and the compilation of the target codes is transferred to the virtual machine. The execution engine can mainly control the code execution process, thereby improving the code execution efficiency. For the target codes to achieve the rendering effect, a rendering speed can be increased and the rendering effect can be optimized.

In an embodiment, the initialization instruction includes an identification of the wrapper object to be initialized. In another embodiment, the initialization instruction may include a method name and/or a parameter of the wrapper object in addition to the identification of the wrapper object. The number and a type of wrapper objects initialized by different object codes may be different. A wrapper object may include one or more method names, and each method name may correspond to a function name related to interaction in an operating system. For example, a wrapper object of a picture corresponds to Image (image component) in the Android system, and a method for setting image resources corresponds to a setImage method in an Image operating system. The parameter may include resources required to execute the method corresponding to a method name, such as a uniform resource locator (URL) address of an image.

In S12, the sending the registration instruction to the registration component according to the initialization instruction, to create the wrapper object required for executing the target codes, includes: sending, to the registration component, the registration instruction comprising the identification of the wrapper object to be registered, wherein the registration component creates a corresponding wrapper object in a wrapper module according to the identification of the wrapper object to be registered. The wrapper object is created in the wrapper module through the virtual machine by controlling the registration component, so that target codes are compiled to obtain the execution codes corresponding to the target codes, according to the mapping relationship between the wrapper object and the native codes of the operating system, thereby improving the code compilation efficiency and the execution efficiency.

In another embodiment, the registration instruction may include the method name and or the parameter of the wrapper object in addition to the identification of the wrapper object. In addition, the content and the format of the initialization instruction and those of the registration instruction may be identical or different. That is to say, the virtual machine can modify the content and the format of the received initialization instruction and send it to the registration component, or can forward the initialization instruction directly to the registration component as a registration instruction without modification.

In an example, referring to FIG. 3, after receiving the initialization instruction, the virtual machine 32 may send the registration instruction to the registration component 33, such as the wrapper registration component (Wrapper Registry). After receiving the registration instruction, the registration component 33 may send a creation instruction to the wrapper module (Wrapper) 34. The creation instruction includes the identification, the method name, and the parameter of the wrapper object to be registered in the target codes. The wrapper module 34 can create a wrapper object 341 required to execute the target codes according to the creation instruction. There are many types of wrapper objects, including but not limited to an image component (Image), a view component (View), a text component (Text), an image view component (ImageView), a page component (Pager), a page manager component (PageManager), a container (Container) component, a scrolling window component (ScrollView), a frame component (Frame), a list component (List), a network component (Network), and the like.

In an example, in a case that the wrapper object corresponding to a certain part of the target codes is an image component (Image), the identification of the wrapper object may be "Image", the method name may be setImage, and the parameter may include a width, a length, and a URL Address and the like.

By creating wrapper objects in the wrapper module, it may acquire the mapping relationship between each wrapper object and the native codes of the operating system. After registering and creating the wrapper object, the wrapper module can return the mapping relationship to the registration component. The registration component returns the mapping relationship to the virtual machine, such that the virtual machine compiles the execution codes corresponding to the target codes according to the mapping relationship. Then, the virtual machine can send the execution codes to the execution engine for to execute the execution codes.

Figure 4:
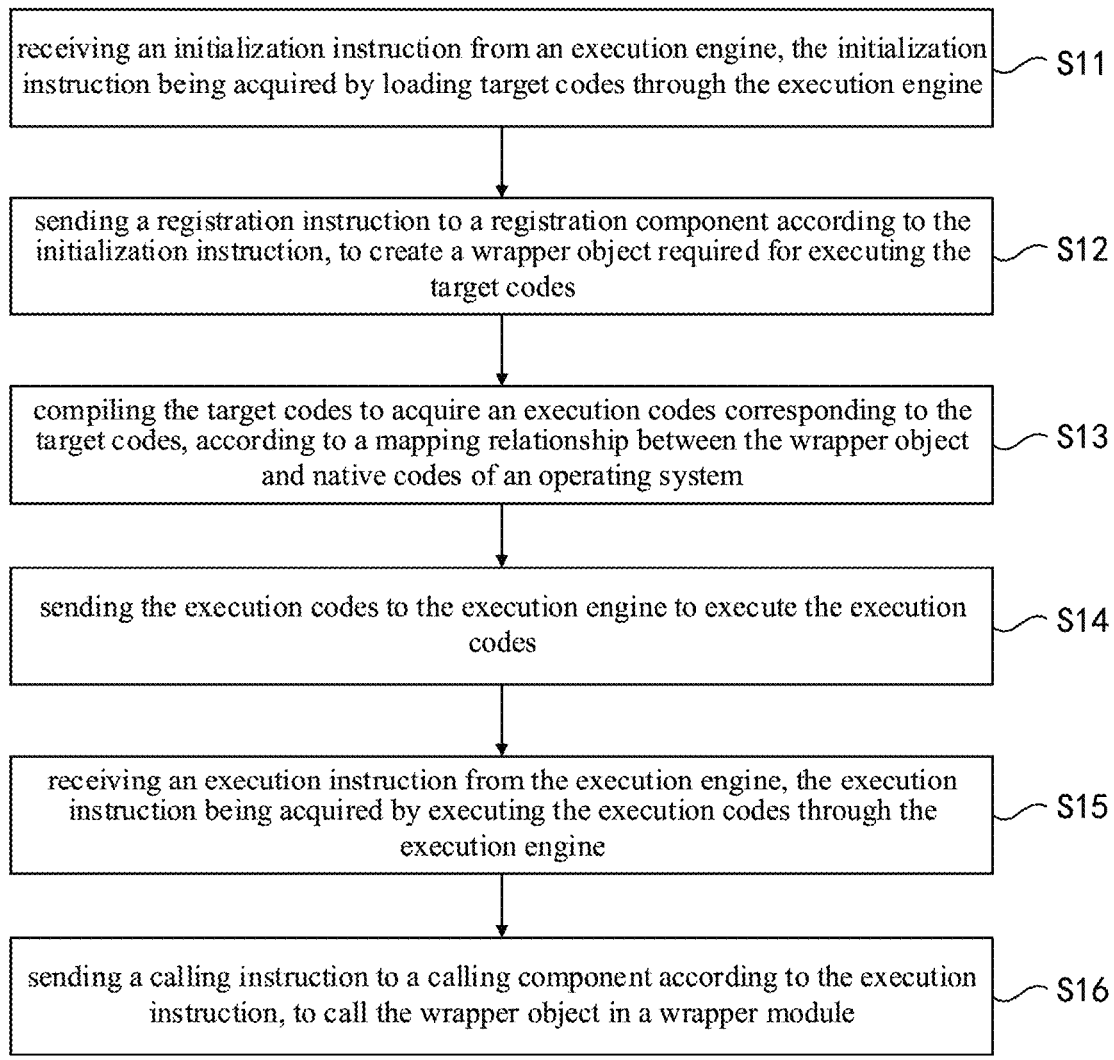
FIG. 4 is a schematic flowchart of a code execution method according to an embodiment of the present application.

In an embodiment, as shown in FIG. 4, the code execution method further includes:

S15, receiving an execution instruction from the execution engine, the execution instruction being acquired by executing the execution codes through the execution engine, and S16, sending a calling instruction to a calling component according to the execution instruction, to call the wrapper object in a wrapper module. Thereby it enables the operating system to execute the native codes corresponding to the called wrapper object. After receiving the execution instruction from the execution engine, the virtual machine can control the calling component to call the created wrapper object, thereby enabling the operating system to execute the native codes corresponding to the called wrapper object. In this way, the code compilation efficiency and the code execution efficiency can be improved due to separation of code compilation and code execution.

In certain embodiments of the present application, there may be one or more wrapper objects required to execute the target codes. In a case that multiple wrapper objects are required to execute the target codes, the registration and calling processes can be executed in serial or in parallel. Referring to FIG. 3, after the virtual machine 32 has created all wrapper objects in serial through the registered component, it can then call each wrapper object through a calling component such as an invoker 35. Also, in the process of creating the wrapper objects through the registered component, the created wrapper component can be called by the calling component in parallel.

In an embodiment, the execution instruction includes an identification of the wrapper object to be executed, a method name of the wrapper object to be executed, and the calling component is an invoker. Then the sending a calling instruction to a calling component according to the execution instruction, to call the wrapper object in a wrapper module includes: sending the calling instruction comprising the identification, method name, and parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system. The virtual machine is configured to control the invoker to call each wrapper object in the wrapper module using the identification, the method name, and the parameter of the wrapper object to execute the native codes corresponding to each wrapper object in the operating system, so that the mapping and calling of the codes can be separated and multiple wrapper objects can be continuously called. Therefore, objects can be reused, and the code execution efficiency is improved.

During the executing of the execution codes, the execution engine may send an execution instruction to the virtual machine. After receiving the execution instruction, the virtual machine may send a calling instruction to the invoker according to the identification, the method name, and the parameter of the wrapper object therein. For example, the identification of the wrapper object included in a certain part of the execution codes is "Image", the method name is setImage, and the parameter includes a width, a length, and a URL address. After receiving the calling instruction, the invoker can retrieve the wrapper object and an image component corresponding to the identification "Image" of the wrapper object to be executed in the wrapper module. Then, the method corresponding to the method name of the image component is called, and the length, the width of the image component and the image in the URL address is loaded. The native codes that need the image component are executed in the operating system, so that the rendering effect of the image component is displayed on the screen.

In certain embodiments of the present application, the content and the format of the execution instruction and those of the calling instruction may be identical or different. In other words, the virtual machine can modify the content and the format of the received execution instruction and send it to the calling component, or it can forward the execution instruction directly to the calling component without modification.

In a case that the execution codes include multiple wrapper objects to be executed, the execution engine may send multiple execution instructions to the virtual machine according to a logical order in the execution codes. The virtual machine sends multiple calling instructions to the invoker, to call these wrapper objects in turn. For example, in a case that the wrapper object to be executed includes an image component, a scrolling window component and a list component, the execution engine can control a calling sequence of these components according to the logical order of execution codes. Firstly, the image component is displayed, then the scroll view component is displayed, and finally the list component is displayed. The execution engine can sequentially call the image component, the scrolling window component, and the list component through the virtual machine and the invoker.

Figure 5:
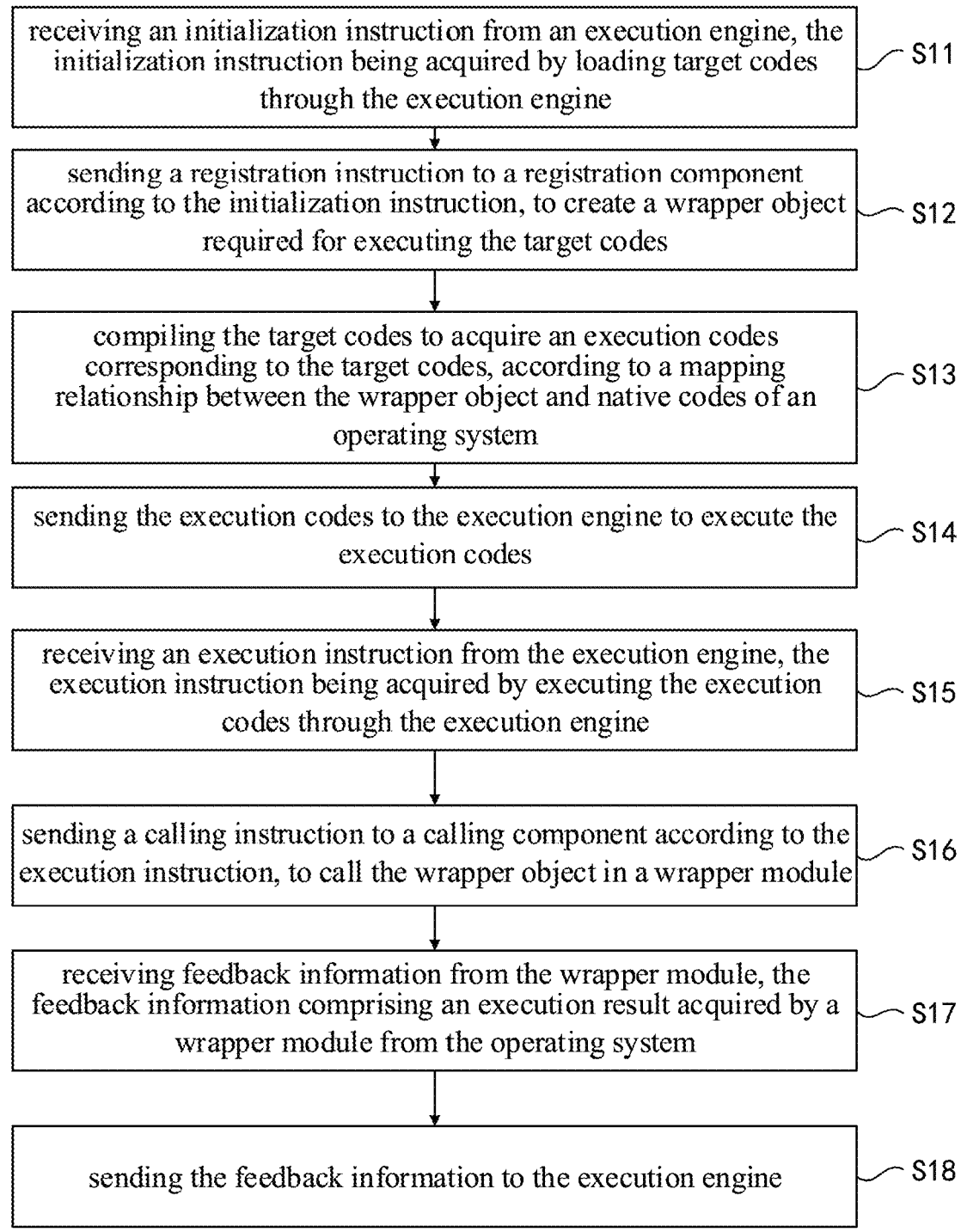
FIG. 5 is a schematic flowchart of a code execution method according to an embodiment of the present application.

In an embodiment, as shown in FIG. 5, the code execution method further includes:

S17, receiving feedback information from the wrapper module, the feedback information comprising an execution result acquired by a wrapper module from the operating system; and S18, sending the feedback information to the execution engine.

After the wrapper module acquires the execution result of the native codes corresponding to the wrapper object from the operating system, it may send feedback information including the execution result to the virtual machine. In a case that there are other changes in the operating system, such as system power being low, the feedback information can also be sent to the virtual machine by the wrapper module. Then, the virtual machine can send the feedback information to the execution engine. The execution engine can continue to execute subsequent execution codes by considering the feedback information. For example, after receiving a feedback message that the system power is low, the execution engine will feed back the low power information to the user when the current codes are executed.

In an embodiment, in S11, the receiving an initialization instruction from an execution engine includes: receiving the initialization instruction from the execution engine through a bridge.

In an embodiment, in S14, the sending the execution codes to the execution engine to execute the execution codes includes: sending the execution codes to the execution engine through a bridge to execute the execution codes.

Referring to FIG. 3, a message can be exchanged between the execution engine and the virtual machine through the bridge, so that the message transmission related to the target codes and the native codes can be realized, and a capacity of the operating system itself are fully utilized, which is beneficial to improve the code execution efficiency while ensuring security. The virtual machine receives initialization instructions and execution instructions from the execution engine through the bridge. Further, the virtual machine sends the obtained execution codes by compiling and various feedback information acquired from the operating system to the execution engine through the bridge, so that the execution engine can continue to execute the subsequent execution codes by considering the feedback information.

Figure 6:
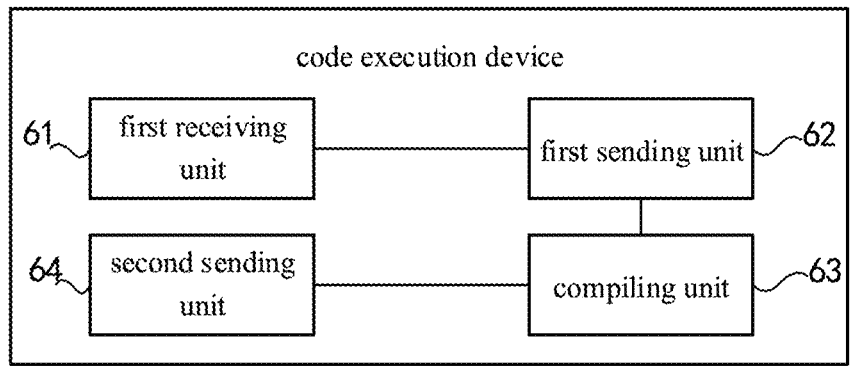
FIG. 6 is a structural block diagram of a code execution device according to an embodiment of the present application.

FIG. 6 is a structural block diagram of a code execution device according to an embodiment of the present application. As shown in FIG. 6, the code execution device may be applied to a virtual machine, and the device may include:

a first receiving unit 61 configured to receive an initialization instruction from an execution engine, the initialization instruction being acquired by loading target codes through the execution engine;

a first sending unit 62 configured to send a registration instruction to a registration component according to the initialization instruction, to create a wrapper object required for executing the target codes;

a compiling unit 63 configured to compile the target codes to acquire an execution codes corresponding to the target codes, according to a mapping relationship between the wrapper object and native codes of an operating system; and a second sending unit 64 configured to send the execution codes to the execution engine to execute the execution codes.

In an implementation, the initialization instruction comprises an identification of the wrapper object to be initialized, and the first sending unit 62 is further configured to send, to the registration component, the registration instruction comprising the identification of the wrapper object to be registered, wherein the registration component creates a corresponding wrapper object in a wrapper module according to the identification of the wrapper object to be registered.

Figure 7:
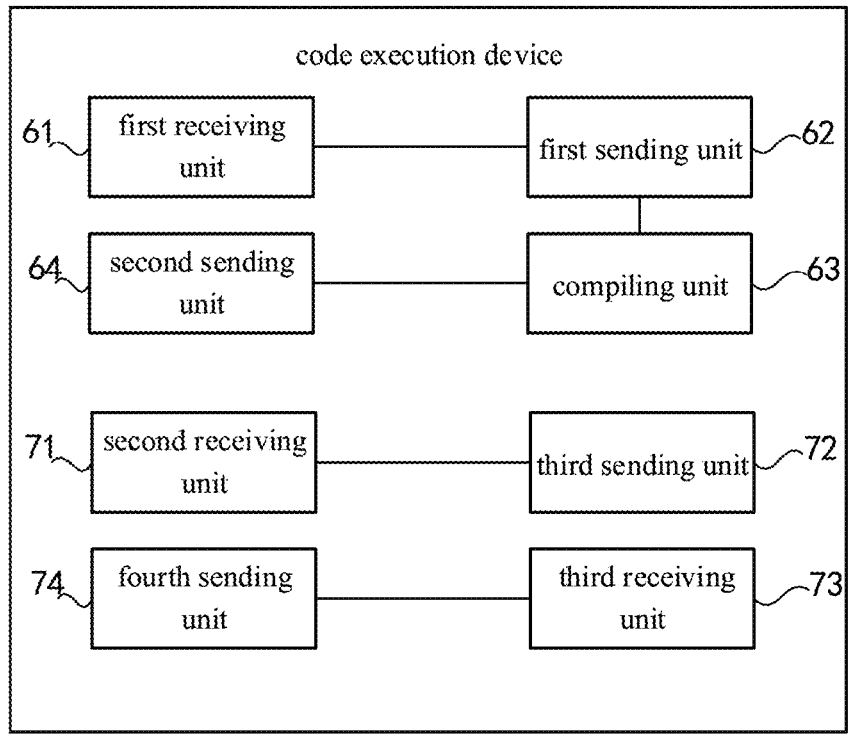
FIG. 7 is a structural block diagram of a code execution device according to an embodiment of the present application.

In an implementation, as shown in FIG. 7, the device further includes:

a second receiving unit 71 configured to receive an execution instruction from the execution engine, the execution instruction being acquired by executing the execution codes through the execution engine; and a third sending unit 72 configured to send a calling instruction to a calling component according to the execution instruction, to call the wrapper object in a wrapper module.

In an implementation, the execution instruction comprises an identification of the wrapper object to be executed, a method name of the wrapper object to be executed, and a parameter of the wrapper object to be executed, and the calling component is an invoker, and the third sending unit 72 is further configured to send the calling instruction comprising the identification, method name, and parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system.

In an implementation, the device further includes:

a third receiving unit 73 configured to receive feedback information from the wrapper module, the feedback information comprising an execution result acquired by a wrapper module from the operating system; and a fourth sending unit 74 configured to send the feedback information to the execution engine.

In this embodiment, functions of units in the code execution device refer to the corresponding description of the above mentioned method and thus the description thereof is omitted herein.

Figure 8:
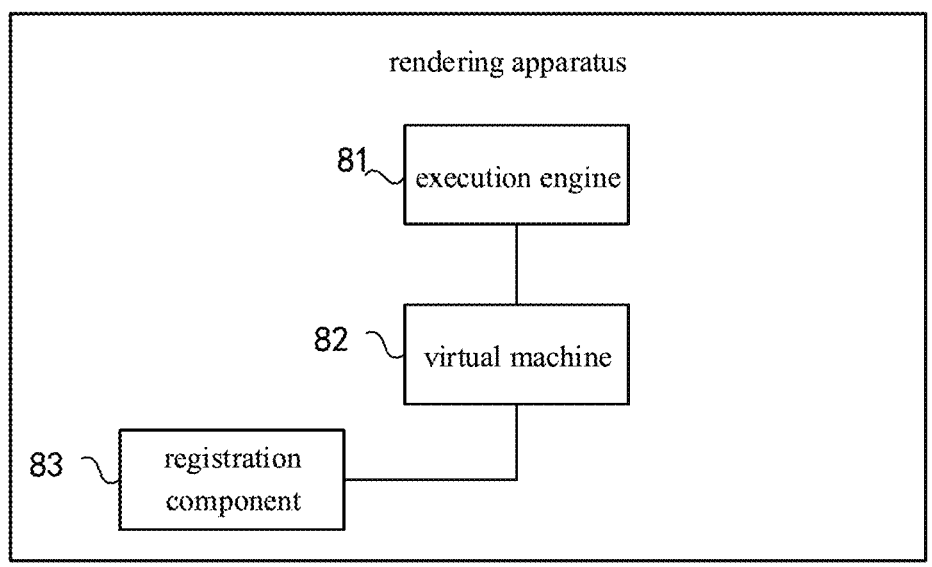
FIG. 8 is a structural block diagram of a rendering apparatus according to an embodiment of the present application.

FIG. 8 is a structural block diagram of a rendering apparatus according to an embodiment of the present application. As shown in FIG. 8, the rendering apparatus may include:

an execution engine 81 configured to send an initialization instruction to a virtual machine, the initialization instruction being an instruction acquired by loading a target codes through the execution engine; and receive execution codes, corresponding to the target codes, returned by the virtual machine;

a virtual machine 82 configured to execute the code execution method of any embodiment of the present application, which refers to the corresponding description in the above code execution method in details, and thus the description thereof is omitted herein;

a registration component 83 configured to receive a registration instruction from the virtual machine to create a wrapper object required to execute the target codes.

In an embodiment, the execution engine 81 is further configured to send an execution instruction to the virtual machine, wherein the execution instruction is an instruction acquired by executing the execution codes through the execution engine.

Figure 9:
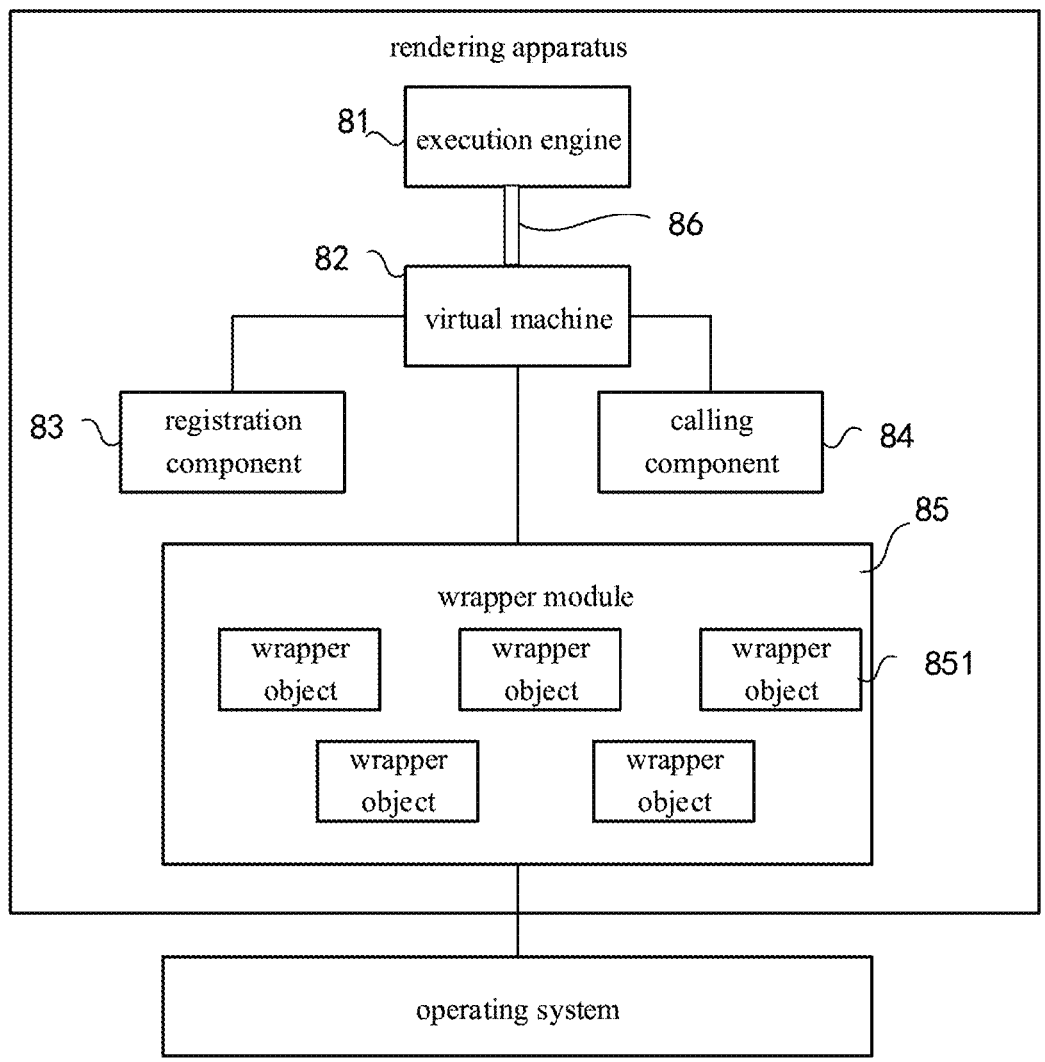
FIG. 9 is a structural block diagram of a rendering apparatus according to an embodiment of the present application.

In an embodiment, as shown in FIG. 9, the rendering apparatus further includes:

a calling component 84 configured to receive a calling instruction from the virtual machine to call the wrapper object in a wrapper module;

a wrapper module 85 including at least one wrapper object 851 required to execute the target codes.

In an embodiment, the rendering apparatus further includes: a bridge 86 configured to send initialization instructions from the execution engine to the virtual machine, and send the execution codes from the virtual machine to the execution engine. The bridge 86 may also send the execution instruction of the execution engine to the virtual machine, and receive the execution result returned by the virtual machine.

In an application example, referring to FIG. 3, the rendering apparatus may include an execution engine 31, a virtual machine 32, a wrapper registry 33, an invoker 35, a bridge 37, and so on. Taking the execution engine as a V8 engine and the virtual machine as an AtomVM as an example, the process of executing the target codes by the rendering apparatus is explained. In this example, the code execution function of the V8 engine is mainly used, and the codes are compiled by the virtual machine.

The target codes are loaded in the execution engine 31 to generate an initialization instruction. The virtual machine 32 can manage the wrapper object, to realize the mapping of the target codes to the wrapper object on the device end. In addition, the virtual machine 32 can also manage an execution environment of the execution engine and the target codes, such as the execution of a v8 engine initialization and a framework initialization. The virtual machine interacts with the target codes through the bridge, and the bridge 37 is a unified message path between the target codes and the native codes.

After loading the target codes and determining which of methods for the wrapper objects at the device end need to be called, the execution engine 31 can send the initialization instruction to the virtual machine 32 through the bridge 37. Each instruction can include an object identification (id), a method name and a parameter. For example, the object identification is "image", the method name is "setImage", and the parameter includes {a, b, c}.

The virtual machine 32 can retrieve a corresponding wrapper object 341 according to the object identification, and implement the calling of the method name of the wrapper object 341 to corresponding native codes through the invoker 35, thereby completing calling of the corresponding method according to the method name.

After calling the method, the execution result may be called back to the target codes. The wrapper object 341 may also generate various events at the end. In both cases, a message can be transmitted to the target codes through the unified message path (bridge) of the VM.

In certain embodiments of the present application, the wrapping and mapping of the execution engine and the native codes are integrated through a mechanism of the virtual machine, which not only ensures an execution efficiency of the target codes, but also ensures the security of the system.

Figure 10:
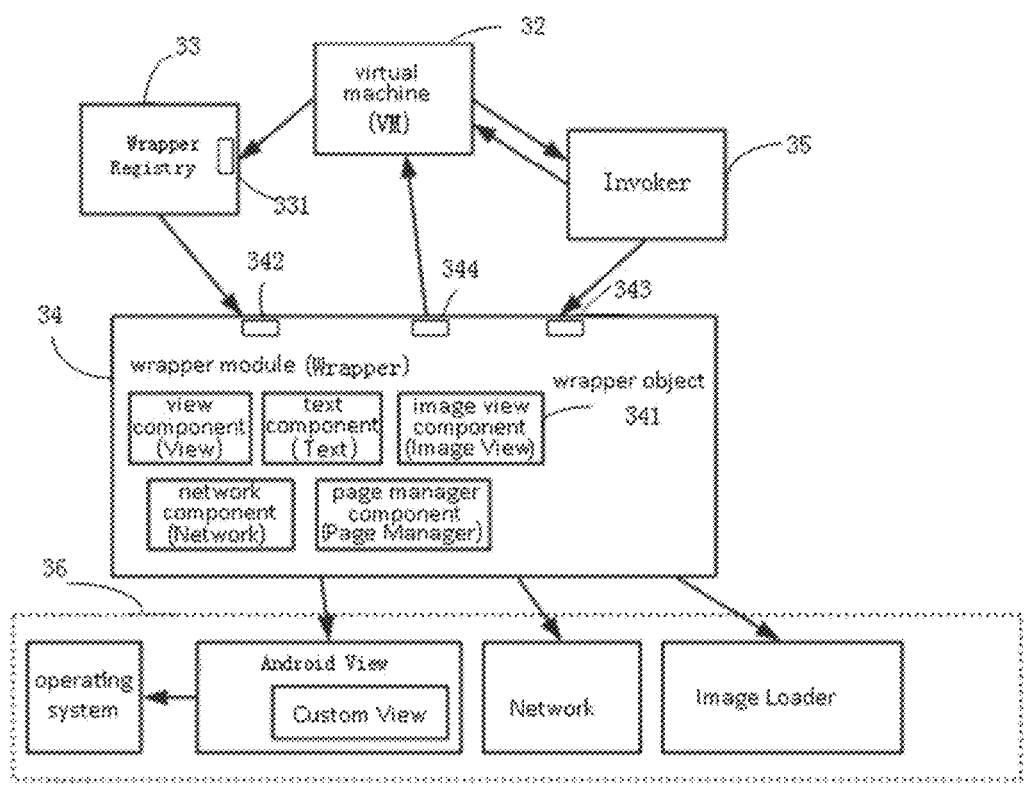
FIG. 10 is a schematic diagram of a wrapper interface of a rendering apparatus according to an embodiment of the present application.

In an embodiment, as shown in FIG. 10, after wrapping the native codes in the operating system at the device end in advance, the identification and method name corresponding to each wrapper object can be acquired. For example, the components and capacities at the end are wrapped through a wrapper class, which provides an interface suitable for calling by an upper layer, so that the wrapper objects at the end are conveniently managed. The wrapper object can include internal implementations and third-party developer extensions. Through the wrapper registry component (wrapper registry) 33, all types of wrapper objects can be registered by the upper layer, so that the execution engine knows which components are included in a specific wrapper object and what methods are in the wrapper object. The wrapper registry component (wrapper registry) also provides an interface for creating various types of wrapper objects, so that various wrapper objects 341 can be created in the wrapper module 34. After the wrapper object is created, the execution engine 31 can operate the wrapper object through the virtual machine 32 and the invoker 35, and call a method of the wrapper object 341.

All the wrapper objects of the above operating system are equivalent to a wrapper object pool. Different target codes may need to create different wrapper objects. A dynamic module including one or more wrapper objects is created according to the target codes, and is called as a wrapper module 34. As shown in FIG. 10, the wrapper module 34 may provide multiple APIs (Application Programming Interface), such as a creation interface 342, a calling interface 343, and a feedback interface 344. The API provided by the wrapper registration component 33 is a registration interface 331. The wrapper registration component 33 may receive the registration instruction from the virtual machine through the registration interface 331, and the registration instruction may include the identification, the method name, and the parameter of the wrapper object to be registered in the target codes (the registration instruction may also include only the identification of the wrapper object, or include only the ID and the method name of the wrapper object, or only the ID and the parameter of the wrapper object). The wrapper registration component 33 can send a creation instruction to the wrapper module 34 through the creation interface 342. The creation instruction includes the identification, the method name, and the parameter of the wrapper object to be registered in the target codes (the creation instruction may also include only the identification of the wrapper object, or include only the ID and the method name of the wrapper object, or only the ID and the parameter of the wrapper object). The wrapper module 34 creates a respective wrapper object 341 in the wrapper module 34 according to the identification, the method name, and the parameter of each wrapper object to be registered in the target codes. After the registration is completed, the wrapper module 34 may return the mapping relationship between the created wrapper object and the native codes to the wrapper registration component 33 through the creation interface 342. The wrapper registration component 33 returns the mapping relationship between the created wrapper object and the native codes to the virtual machine 32 through the registration interface 331. The virtual machine 32 compiles the target codes to obtain the corresponding execution codes according to the above mapping relationship. In addition, the virtual machine can also send a calling instruction to the invoker 35. The invoker 35 calls the wrapper object 341 that has been created in the wrapper module 34 through the calling interface 343, and executes the corresponding native codes of the wrapper object in the operating system 36.

In certain embodiments of the present application, the content and the format of the registration instruction and the creation instruction may be identical or different. In other words, the registration component can modify the content and the format of the received registration instruction and send it to the wrapper module, or can forward the registration instruction as a creation instruction to the wrapper module without modification.

In certain embodiments of the present application, the native codes are directly wrapped, and through a registration mechanism, the registration and the calling are open. Due to a dynamic registration, it is convenient to match and upgrade the native codes. The above operating system may include, but is not limited to, for example, an Android (Android) system, an iOS system, or other systems based on Linux.

Figure 11:
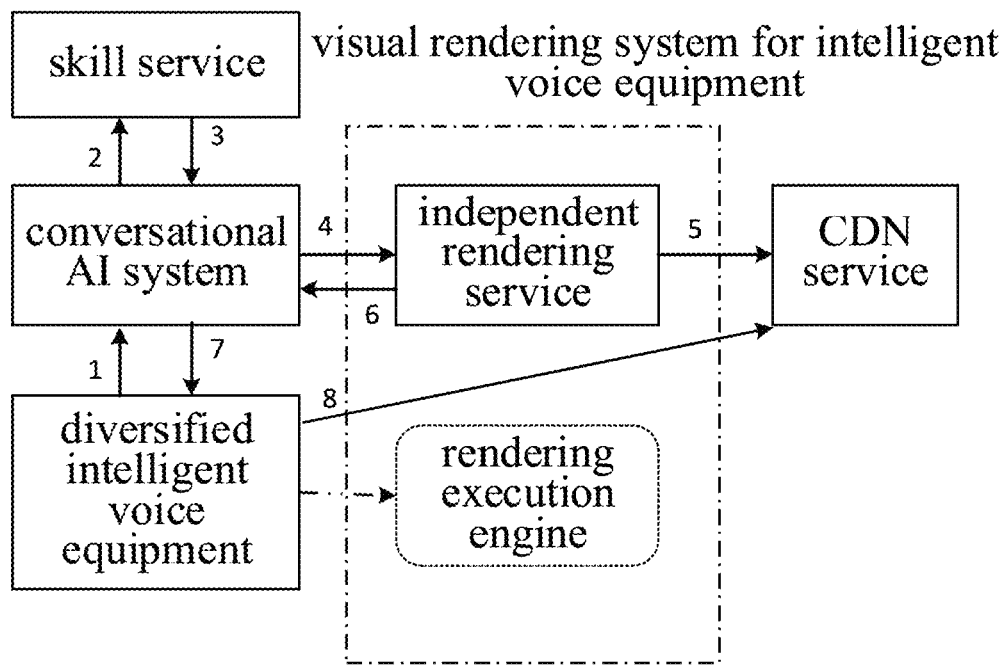
FIG. 11 is a schematic diagram of an application scenario of a rendering apparatus according to an embodiment of the present application.

As shown in FIG. 11, it is a schematic diagram of a rendering system according to an embodiment of the present application. The rendering system may be a visual rendering system for an intelligent speech apparatus. The rendering system may include skill services, conversational AI systems, independent rendering services, CDN services, intelligent speech apparatuses, and so on.

An overall business process is as follows.

1) A user inquires an intelligent speech apparatus through speech, and the intelligent speech apparatus transmits the user inquiry to a conversational AI system. The intelligent speech apparatus is the device end in the foregoing embodiment. The device end can have a screen.
2) After the conversational AI system performs Automatic Speech Recognition (ASR) and Natural Language Understanding (NLU) processing, an intent is transmitted to a skill service. The skill service may be a server that provides content to be rendered.
3) The skill service returns the content to be rendered to the conversational AI system, and the content to be rendered can include content and resources.
4) The conversational AI system transmits the content to be rendered, the information of the intelligent speech apparatus, and the information of the skill service to an independent rendering server.
5) The independent rendering server transmits static data in the content to be rendered to a content delivery network (CDN) service.
6) The independent rendering service selects a rendering template suitable for the intelligent speech apparatus based on the content received in 4), and applies the selected rendering template to render the content to be rendered, to generate target codes that are executed conveniently by the intelligent speech apparatus, and to return the target codes to the conversational AI system.
7) Data of the received target codes and related context information and the like are returned to the intelligent speech apparatus by the conversational AI system.
8) The above target codes are executed by a rendering execution engine in the intelligent speech apparatus and are displayed on the screen. The static resources in the content to be rendered can be pulled directly from the CDN by the intelligent speech apparatus.

A structure of the rendering execution engine may refer to the rendering apparatus in the foregoing embodiment. For example, referring to FIG. 3, the rendering execution engine includes an execution engine 31, a virtual machine 32, a wrapper registration component 33, an invoker 35, a bridge 37, and the like. The target codes are loaded in the execution engine 31. Further, the identification, the method name, and the parameter of the wrapper object required to execute the target codes are sent to the virtual machine 32 through the bridge. The virtual machine 32 creates each wrapper object in the wrapper module 34 through the wrapper registration component 33. After the creation is completed, the virtual machine 32 can call the wrapper object 341 through the invoker 35 to implement the calling of the method name of the wrapper object 341 to the corresponding native codes, thereby calling the corresponding method according to the method name. After calling the method, the execution result may be called back to the target codes. The wrapper object 341 may also generate events on various ends. After the wrapper module feeds back these messages to the virtual machine, the virtual machine passes these messages to the execution engine through the bridge.

The specific working principle of the rendering execution engine may refer to the code execution method, code execution apparatus, and rendering apparatus in the foregoing embodiments, and the related descriptions of FIG. 3, FIG. 10, and FIG. 11 and so on.

According to an embodiment of the present application, the present application further provides an electronic apparatus and a readable storage medium.

Figure 12:
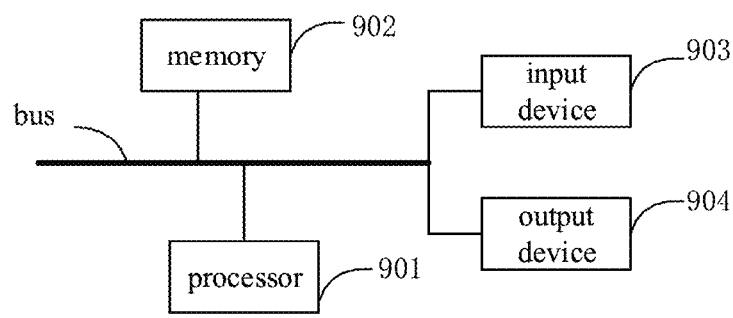
FIG. 12 is a block diagram of an electronic apparatus for implementing the code execution method according to an embodiment of the present application.

As shown in FIG. 12, it is a block diagram of an electronic apparatus according to the code execution method according to the embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital processing, cellular phones, intelligent phones, wearable devices, and other similar computing devices. The components shown here, their connections and relations, and their functions are merely examples, and are not intended to limit the implementation of the application described and/or required herein.

As shown in FIG. 12, the electronic apparatus includes: one or more processors 901, a memory 902, and interfaces for connecting various components, including a high-speed interface and a low-speed interface. The various components are interconnected using different buses and can be mounted on a common motherboard or otherwise installed as required. The processor may process instructions executed within the electronic apparatus, including storing in or on a memory to display a graphical user interface (GUI) on an external input/output device such as a display device coupled to the interface) Graphic information instructions. In other embodiments, multiple processors and/or multiple buses can be used with multiple memories and multiple memories, if desired. Similarly, multiple electronic apparatus can be connected, each providing some of the necessary operations (for example, as a server array, a group of blade servers, or a multiprocessor system). A processor 901 is taken as an example in FIG. 12.

The memory 902 is a non-transitory computer-readable storage medium provided by the present application. The memory stores instructions executable by at least one processor, so that the at least one processor executes the code execution method provided in the present application. The non-transitory computer-readable storage medium of the present application stores computer instructions, which are used to cause a computer to execute the code execution method provided by the present application.

As a non-transitory computer-readable storage medium, the memory 902 can be used to store non-transitory software programs, non-transitory computer executable programs, and modules, such as program instructions corresponding to the code execution method in the embodiments of the present application. Module/unit (for example, the first receiving unit 61, the first sending unit 62, the compiling unit 63 and the second sending unit 64 shown in FIG. 6). The processor 901 executes various functional applications and data processing of the server by running non-transitory software programs, instructions, and modules stored in the memory 902, that is, the code execution method in the embodiments of the foregoing method can be implemented.

The memory 902 may include a storage program area and a storage data area, where the storage program area may store an operating system and an application program required for at least one function; the storage data area may store data created according to the use of the electronic device of the code execution method, etc. In addition, the memory 902 may include a high-speed random access memory, and may also include a non-transitory memory, such as at least one magnetic disk storage device, a flash memory device, or other non-transitory solid-state storage device. In some embodiments, the memory 902 may optionally include a memory remotely set relative to the processor 901, and these remote memories may be connected to the electronic apparatus with the code execution method through a network. Examples of the above network include, but are not limited to, the Internet, an intranet, a local area network, a mobile communication network, and combinations thereof.

The electronic apparatus with the code execution method may further include an input device 903 and an output device 604. The processor 901, the memory 902, the input device 903, and the output device 604 may be connected through a bus or in other manners. In FIG. 12, the connection through the bus is taken as an example.

The input device 903 can receive inputted numeric or character information, and generate key signal inputs related to user settings and function control of an electronic apparatus for code execution method, such as a touch screen, a keypad, a mouse, a trackpad, a touchpad, a pointing stick, one or more mouse buttons, a trackball, a joystick and other input devices. The output device 604 may include a display device, an auxiliary lighting device (for example, an LED), a haptic feedback device (for example, a vibration motor), and the like. The display device may include, but is not limited to, a liquid crystal display (Liquid Crystal Display, LCD), a light emitting diode (Light Emitting Diode, LED) display, and a plasma display. In some embodiments, the display device may be a touch screen.

Various implementations of the systems and technologies described herein can be implemented in digital electronic circuit systems, integrated circuit systems, application specific integrated circuits (ASICs), a computer hardware, a firmware, a software, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or code) include machine instructions of a programmable processor and can be implemented using high-level procedural and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLD)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a CRT (Cathode Ray Tube) or LCD (liquid crystal display) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, speech input, or tactile input) to receive input from the user.

The systems and technologies described herein can be implemented in a subscriber computer of a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including such background components, middleware components, or any combination of front-end components. The components of the system may be interconnected by any form or medium of digital data communication (such as, a communication network). Examples of communication networks include: a local area network (LAN), a wide area network (WAN), and the Internet.

Computer systems can include clients and servers. The client and server are generally remote from each other and typically interact through a communication network. The client-server relation is generated by computer programs running on the respective computers and having a client-server relation with each other.

According to the technical solution of certain of the embodiments of the present application, a wrapper object can be created through the virtual machine control registration component, and the compilation of the target codes is transferred to the virtual machine for execution. The execution engine can mainly control the code execution process, thereby improving efficiency of the code execution.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementation manners do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A code execution method, applied to a virtual machine, the code execution method comprising:
   receiving an initialization instruction from an execution engine, the initialization instruction being acquired by loading target codes through the execution engine;
   sending a registration instruction to a registration component according to the initialization instruction, to create a wrapper object required for executing the target codes and acquire a mapping relationship between the wrapper object and native codes of an operating system;
   compiling the target codes to acquire execution codes corresponding to the target codes, according to the mapping relationship between the wrapper object and the native codes of the operating system; and
   sending the execution codes to the execution engine to execute the execution codes.

2. The code execution method of claim 1, wherein:
   the initialization instruction comprises an identification of the wrapper object to be initialized, and
   the sending the registration instruction to the registration component comprises sending, to the registration component, the registration instruction comprising the identification of the wrapper object to be registered, wherein the registration component creates a corresponding wrapper object in a wrapper module according to the identification of the wrapper object to be registered.

3. The code execution method of claim 2, wherein the sending the execution codes to the execution engine comprises sending the execution codes to the execution engine through a bridge to execute the execution codes.

4. The code execution method of claim 2, further comprising:
   receiving feedback information from the wrapper module, the feedback information comprising an execution result acquired by the wrapper module from the operating system; and
   sending the feedback information to the execution engine.

5. The code execution method of claim 1, further comprising:
   receiving an execution instruction from the execution engine, the execution instruction being acquired by executing the execution codes through the execution engine; and
   sending a calling instruction to a calling component according to the execution instruction, to call the wrapper object in a wrapper module.

6. The code execution method of claim 5, further comprising:
   receiving feedback information from the wrapper module, the feedback information comprising an execution result acquired by the wrapper module from the operating system; and
   sending the feedback information to the execution engine.

7. The code execution method of claim 5, wherein:
   the execution instruction comprises an identification of the wrapper object to be executed, a method name of the wrapper object to be executed, and a parameter of the wrapper object to be executed,
   the calling component is an invoker, and
   the sending the calling instruction to the calling component comprises sending the calling instruction comprising the identification, the method name, and the parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system.

8. The code execution method of claim 5, further comprising:
   receiving feedback information from the wrapper module, the feedback information comprising an execution result acquired by the wrapper module from the operating system; and
   sending the feedback information to the execution engine.

9. The code execution method of claim 1, wherein the receiving the initialization instruction from the execution engine comprises receiving the initialization instruction from the execution engine through a bridge.

10. The code execution method of claim 1, wherein the sending the execution codes to the execution engine comprises sending the execution codes to the execution engine through a bridge to execute the execution codes.

11. The code execution method of claim 1, further comprising:
   receiving feedback information from a wrapper module, the feedback information comprising an execution result acquired by the wrapper module from the operating system; and
   sending the feedback information to the execution engine.

12. A code execution device, applied to a virtual machine, the code execution device comprising:
   at least one processor; and
   at least one storage device configured for storing at least one program, wherein the at least one program is executed by the at least one processors to enable the at least one processor to:
   receive an initialization instruction from an execution engine, the initialization instruction being acquired by loading target codes through the execution engine;
   send a registration instruction to a registration component according to the initialization instruction, to create a wrapper object required for executing the target codes and acquire a mapping relationship between the wrapper object and native codes of an operating system;
   compile the target codes to acquire execution codes corresponding to the target codes, according to the mapping relationship between the wrapper object and the native codes of the operating system; and
   send the execution codes to the execution engine to execute the execution codes.

13. The code execution device of claim 12, wherein the initialization instruction comprises an identification of the wrapper object to be initialized, and when executed by the at least one processor, the at least one program enables the at least one processor to send, to the registration component, the registration instruction comprising the identification of the wrapper object to be registered, wherein the registration component creates a corresponding wrapper object in a wrapper module according to the identification of the wrapper object to be registered.

14. The code execution device of claim 12, wherein when executed by the at least one processor, the at least one program enables the at least one processor to:
  receive an execution instruction from the execution engine, the execution instruction being acquired by executing the execution codes through the execution engine; and
  send a calling instruction to a calling component according to the execution instruction, to call the wrapper object in a wrapper module.

15. The code execution device of claim 14, wherein:
  the execution instruction comprises an identification of the wrapper object to be executed, a method name of the wrapper object to be executed, and a parameter of the wrapper object to be executed,
  the calling component is an invoker, and
  when executed by the at least one processor, the at least one program enables the at least one processor to send the calling instruction comprising the identification, the method name, and the parameter of the wrapper object to be executed to the invoker, wherein the invoker retrieves the wrapper object corresponding to the identification of the wrapper object to be executed in the wrapper module, calls the method corresponding to the method name of the wrapper object to be executed, and loads the parameter of the wrapper object to be executed, to execute the native codes corresponding to the wrapper object to be executed in the operating system.

16. The code execution device of claim 12, when executed by the at least one processor, the at least one program enables the at least one processor:
  receive feedback information from a wrapper module, the feedback information comprising an execution result acquired by the wrapper module from the operating system; and
  send the feedback information to the execution engine.

17. A rendering apparatus comprising:
  an execution engine configured to:
    send an initialization instruction to a virtual machine, the initialization instruction being an instruction acquired by loading target codes through the execution engine; and
    receive execution codes, corresponding to the target codes, returned by the virtual machine;
  the virtual machine configured to:
    receive the initialization instruction from the execution engine;
    send a registration instruction to a registration component according to the initialization instruction, to create a wrapper object required for executing the target codes and acquire a mapping relationship between the wrapper object and native codes of an operating system;
    compile the target codes to acquire execution codes corresponding to the target codes, according to the mapping relationship between the wrapper object and the native codes of the operating system; and
    send the execution codes to the execution engine to execute the execution codes; and
  the registration component configured to receive the registration instruction from the virtual machine to create the wrapper object required to execute the target codes.

18. The rendering apparatus of claim 17, wherein:
  the execution engine is further configured to send an execution instruction to the virtual machine, wherein the execution instruction is an instruction acquired by executing the execution codes through the execution engine; and
  the rendering apparatus comprises a calling component configured to receive a calling instruction from the virtual machine to call the wrapper object in a wrapper module comprising at least one wrapper object required to execute the target codes.

19. The rendering apparatus of claim 17, further comprising a bridge configured to:
  send the initialization instruction from the execution engine to the virtual machine, and
  send the execution codes from the virtual machine to the execution engine.

20. A non-transitory computer-readable storage medium, in which instructions of a computer are stored, wherein the instructions are configured to enable the computer to:
  receive an initialization instruction from an execution engine, the initialization instruction being acquired by loading target codes through the execution engine;
  send a registration instruction to a registration component according to the initialization instruction, to create a wrapper object required for executing the target codes and acquire a mapping relationship between the wrapper object and native codes of an operating system;
  compile the target codes to acquire execution codes corresponding to the target codes, according to the mapping relationship between the wrapper object and the native codes of the operating system; and
  send the execution codes to the execution engine to execute the execution codes.

* * * * *